Patented May 22, 1934

1,959,930

UNITED STATES PATENT OFFICE 1,959,930

HYDROXY-ALKYL ETHERS OF POLYHYDRIC ALCOHOLS AND THEIR PRODUCTION

Otto Schmidt, Ludwigshafen-on-the-Rhine, and Egon Meyer, Mannheim, Germany, assignors to I. G. Farbenindustrie Aktiengesellschaft, Frankfort-on-the-Main, Germany No Drawing. Application May 13, 1931, Serial No. 537,210. In Germany May 22, 1930

11 Claims. (Cl. 260—106)

The present invention relates to the production of hydroxy-alkyl ethers of polyhydric alcohols and preparations containing the same.

We have found that valuable derivatives of polyhydric alcohols are obtained by etherifying or esterifying part of the hydroxyl groups in aliphatic polyhydric alcohols, including their polyhydric derivatives or substitution products, containing more than 3 carbon atoms in the molecule, with aliphatic substances which contain at least 6, preferably from 10 to 18, carbon atoms in the molecule.

Among the said higher alcohols and their derivatives may be mentioned, for example, pentaerythritol, hexitols, various kinds of sugars, carbohydrates or their hydrogenation products, such as sorbitol, as well as the derivatives and substitution products of these substances, as for example the hydroxyl-alkyl ethers obtainable by the action of alkylene oxides on polyhydric alcohols, such as for example the hydroxy-alkyl ethers of glycerol, pentaerythritol or sorbitol and like derivatives, such as alkyl, cycloalkyl, aryl or aralkyl ethers, or esters with aliphatic open chain or cycloaliphatic carboxylic acids or with aromatic carboxylic acids; suitable ethers and esters are for example the methyl, ethyl, butyl, hexyl or cyclohexyl ethers and the acetic, butyric, benzoic or hexahydrobenzoic esters.

In order to introduce the substances with at least 6 carbon atoms in the molecule, alkyl or hydroxyl-alkyl halides (halogenhydrins) aliphatic halogen carboxylic acids, such as chlorostearic, chlorolauric or chlorohydroxy stearic acids, alkylene oxides, as for example hexylene or dodecylene oxides, alcohols and the like, or mono or polybasic aliphatic open chain or cycloaliphatic carboxylic acids, aliphatic sulphonic acids, such as palmitic sulphonic acid, acid sulphuric or phosphoric esters of aliphatic alcohols or of other hydroxyl-bearing aliphatic compounds, such as Turkey red oils, and like substances and also derivatives or substitution products of the said acids, such as acid chlorides, acid anhydrides and the like may be employed.

The incompletely esterified alcohols may be prepared either by heating the polyhydric alcohols with an amount of acid less than is necessary for complete esterification or by allowing the corresponding acid chlorides or anhydrides or like acid derivatives to act on a solution of the polyhydric alcohols, for example in pyridine. Very often a simple heating of the components in the desired proportion leads to the desired result and the course of the reaction may be accelerated by the addition of small quantities of catalysts assisting esterification, such as boric, sulphuric or phosphoric acids and the like. The reaction temperature depends on the kind of compounds to be esterified. It is often preferable to carry out the reaction in inert solvents, such as hydrocarbons, ethers and the like.

The procedure is analogous for the preparation of ethers, as for example the mono-hydroxy-dodecyl ether of sorbitol hexa-hydroxy-ethyl ether, which may be obtained by acting with about 1 molecular proportion of dodecylene chlorhydrin on about 1 molecular proportion of sorbitol hexa-hydroxy-ethyl ether in the presence of an equivalent quantity of alkali, or the said sorbitol hexa-hydroxy-ethyl ether may be employed in the form of its alkali metal compound. If free alcohols be employed, acid agents capable of removing water such as zinc chloride or concentrated sulphuric acid, are advantageously employed.

It will be easily understood that the products according to the present invention correspond to the general formula

in which R denotes an aliphatic radicle which contains at least 4 carbon atoms and may contain ethereally combined oxygen atoms, X denotes

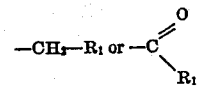

$R_1$ being an aliphatic radicle containing at least 5 carbon atoms, and $n$ is any integral number corresponding to the number of carbon atoms of R less at least 2 and $p$ is any integral number above 1 and at the most the number of carbon atoms of R less $n$, or to the formula

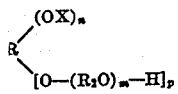

in which R denotes an aliphatic radicle containing at least 4 carbon atoms, X denotes —$CH_2$—$R_1$, or

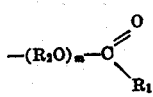

$R_1$ being an aliphatic radicle containing at least 5, preferably from 9 to 17 carbon atoms, and $n$ is any integral number corresponding to the number of carbon atoms of R less at least 2, $R_2$ is an aliphatic radicle, $m$ any integral number and $p$ is any integral number above 1 and is at the most the number of carbon atoms of R less $n$.

The products thus obtained have important properties. Most of them are readily soluble in water, or at least easily emulsifiable in water, although they contain a large number of carbon atoms in the molecule, such as the mono-ester from coconut oil fatty acids and sorbitol hexa-hydroxy-ethyl ether, and generally those containing at least two free hydroxyl groups or several hydroxy-alkyl groups. For the esterification for the preparation of products which are valuable industrially such aliphatic acids are frequently very suitable which contain from 6 to 18 carbon atoms in the molecule.

The more or less easily water-soluble esters and the ethers which are obtainable from the said polyhydric alcohols and their derivatives, as for example sorbitol hexa-hydroxy-ethyl ether, by subsequent treatment with high molecular halogen paraffins, halogenated hydroxy-paraffins or halogenated olefines or carboxylic acids and the like are valuable wetting, cleansing and dispersing agents, without possessing with few exceptions, the disadvantages of basic or acid groups either as such or in the salt form hitherto inherent to the substances usually employed as wetting agents.

The said wetting, cleansing, dispersing and the like agents may be advantageously employed for example in the textile industry for washing, carbonizing, dyeing, printing, rendering fibres soft and flexible and like purposes, in spinning artificial threads as additions to the precipitating baths or to the spinning solutions, and also in the leather industry, for example in soaking hides, in the cleaning industry for the preparation of cleaning agents of all kinds. Boring agents and lubricants having excellent properties may also be prepared with the aid of the said substances. They may be employed in acid, alkaline or neutral liquors with or without additions. Condensation products which still contain several free hydroxyl groups have proved especially advantageous for wetting and emulsifying purposes.

Moreover, the esters or ethers obtainable according to the present invention which are difficultly soluble or insoluble in water but which are easily emulsified in water or aqueous solutions also possess valuable properties, for example they may be employed as soft resins or waxes for softening, sizing and like purposes in the textile industries in the preparation of numerous artificial materials or they may be converted into products valuable as assistants in the textile industries by sulphonation.

The following examples will further illustrate the nature of this invention, but the invention is not restricted to these examples. The parts are by weight.

Example 1

80 parts of sorbitol hexa-hydroxy-ethyl ether are heated for 6 hours at 180° C. with 47 parts of coconut oil fatty acids with an addition of 1.2 parts of boric acid. The temperature is then increased to 200° C. and the whole is heated for another 6 hours. In order to remove the water formed during the reaction it is preferable to lead a current of nitrogen through the apparatus or to work under reduced pressure.

After cooling the reaction product is a thickly liquid brownish mass and has a neutral reaction. It dissolves readily in water and has wetting out properties. The yield amounts to about 112 parts. By employing 1 molecular proportion of sorbitol hexa-hydroxy-ethyl ether with 2 molecular proportions of the said fatty acids, two hydroxyl groups are esterified.

Example 2

54.5 parts of lauric acid chloride are allowed to drop slowly into a solution of 45 parts of sorbitol in 140 parts of dry pyridine while stirring and the solution is stirred for some hours. The solution is then allowed to flow gradually into 500 parts of 25 per cent sulphuric acid, the reaction product being thus precipitated. It is washed thoroughly with dilute aqueous sulphuric acid and water and dried in vacuo. Sorbitol mono-laurate is thus obtained in an almost quantitative yield as a white wax-like substance having a neutral reaction, which can be easily emulsified in water.

Compounds of the same kind are obtained by treating sorbitol tetra- or penta-hydroxy-ethyl ether with decyl-carboxylic acid chlor- or brom-ethyl esters.

Example 3

42.5 parts of a mixture of fatty acids containing from 8 to 11 carbon atoms in the molecule and having an acid value of about 331, obtained by the oxidation of paraffin wax, are heated for 3 hours at 170° C. while leading carbon dioxide therethrough with 100 parts of a mixture of sorbitol hexa-and penta-hydroxy-ethyl ether, and the whole is then further heated while raising the temperature to 190° C. In this manner a homogeneous thick yellowish liquid is obtained in an almost quantitative yield. This consists mainly of the mono esters of the said fatty acids with the sorbitol ethers. Remainders of fatty acids may be removed from the final product, preferably by neutralization with alkali while using phenol phthaleine as the indicator. A product is thus obtained which is surprisingly readily soluble in water and which has an excellent wetting and foaming action which renders it suitable for employment as an auxiliary agent in the textile industry for many purposes.

Example 4

0.5 part of the mono-ester obtainable from 1 molecular proportion of sorbitol hexa-hydroxyethyl ether by heating to about 200° C. with 1 molecular proportion of a mixture of aliphatic fatty acids having an average content of 10 carbon atoms in the molecule and obtained by the oxidation of paraffin wax, is dissolved in 100 parts of water. For textiles, as for example cotton, this solution has a very strong wetting action which is equal to that of a solution of the same concentration of the wetting agents containing acid groups already known, such as butyl-naphthalene sulphonic acid. If, however, the said solution be diluted to 0.2 per cent the wetting action is considerably greater than the wetting action of a solution of the same concentration of another wetting agent, such as the aforesaid sulphonic acid, since the wetting action is only slightly decreased in spite of the great dilution. Similarly ethers may be employed which are obtained from 1 molecular proportion of sorbitol hexa-hydroxy-ethyl ether and 1 molecular proportion of decyl bromide, and substances prepared for example by esterifying poly-hydroxyethyl ethers of sugars with carboxylic acids are also suitable.

Example 5

224 parts of glycerol tri-hydroxy-ethyl ether are esterified with 130 parts of a fatty acid mixture consisting of acids obtained by the oxidation of paraffin wax and containing from 8 to 11 carbon atoms, by heating the mixture for 2 hours at 175° C. and subsequently for 10 hours at 205° C. For removing the water formed during the reaction, a current of nitrogen is passed through the reaction mixture 337 parts of a clear pale yellowish oily liquid are obtained, the product being soluble in water almost completely and with only slight turbidity. The acid value of the product is 8.5 so that it consists mainly of the mono-esters of the aforesaid glycerol ether. Aqueous solutions of the product have a pronounced wetting and foaming action.

Example 6

150 parts of lauric acid and 224 parts of glycerol tri-hydroxy-ethyl ether are heated and then worked up as described in the Example 5. Glycerol tri-hydroxy-ethyl ether mono-laurate is obtained in an almost quantitative yield and constitutes a pale brownish oil which is soluble in water with a slight turbidity and has a good wetting action, for example when employed as an 0.3 per cent aqueous solution.

Example 7

100 parts of a mixture of about equal parts of the hexa-and penta-hydroxy-ethyl ethers of sorbitol are esterified with 30 parts of lauric acid as described in Example 6. A brownish liquid having an acid value of 6 is obtained in a yield of 122 parts which consists mainly of the mono-lauric ester of the aforesaid ethers together with a small quantity of unaltered ethers. The product is completely soluble in water with the formation of clear solutions and has a very good wetting and foaming power.

Example 8

178 parts of the sodium salt of hydroxy-chloro-stearic acid (obtainable by adding hypochlorous acid on to oleic acid, for example according to the German Specification No. 212,001 are heated for 12 hours to 170° C. together with 220 parts of the sodium compound of sorbitol hexa-hydroxy-ethyl ether. After cooling the reaction mass is diluted with water, rendered acid with dilute sulphuric acid and subjected to extraction with methylene chloride. After evaporating the methylene chloride a good yield of a semi-liquid, brownish product is obtained which consists mainly of a 9.10 dihydroxy stearic acid in which one of the hydroxyl groups is etherified with sorbitol-hexa-hydroxy ether. With water the acid forms a stable colloidal solution which has good wetting properties; the alkali metal salts, as for example the sodium salt, being efficient wetting agents.

Example 9

400 parts of the hexa-hydroxy-ethyl ether of sorbitol are heated while stirring for 10 hours at 210° C. with 535 parts of linoleic acid (2 molecular proportions) while removing the water formed by blowing through a current of nitrogen. After cooling, the linoleic di-ester of the hexa-hydroxy-ethyl ether of sorbitol is obtained as a brown oil having an acid value of 13.4. The ester is rather readily soluble in water and furnishes stable aqueous emulsions with water-insoluble liquids.

In the same manner the mono- and tri-linoleic esters can be prepared. The mono-ester is more readily soluble and the tri-ester is less readily soluble than the di-ester. The di-ester is particularly valuable for sizing textiles, especially those from artificial silk for which purpose sizes from linseed oil have largely been employed hitherto. In contrast to the linseed oil sizes which often become hard when stored and are rather difficult to remove from the fibres, the oily di-ester is readily soluble in water, forms stable emulsions when employed in a high concentration without the addition of emulsifying agents, is stable when stored and is easily removed from the fibres after sizing owing to its solubility in water. In many cases the mono-ester may also be employed for the said purpose.

Example 10

200 parts of sorbitol penta-hydroxy-ethyl ether are heated with 95 parts of a naphthenic acid purified by distillation and having an acid value of 285, in the manner described in the foregoing example. 300 parts of the naphthenic ester of sorbitol penta-hydroxy-ethyl ether are obtained which constitutes a dark brown, neutral oil which furnishes an opalescent solution with water, which solution may be employed for wetting cut woolen goods.

In the same way the palmitic mono-ester of the aforesaid sorbitol ether of sorbitol-hexa-hydroxy-ethyl ether can be prepared, the esters being useful for preventing the precipitation of calcium soaps from solutions of soaps in hard water. Thus, for example, from 0.5 to 1 gram of the mono-palmitate of sorbitol hexa-hydroxy-ethyl ether dissolved in a little water and added to 1 liter of water of 25° hardness (German scale) prevent the precipitation of calcium soap if five cubic centimeters of a 10 per cent aqueous solution of grain soap be added to the hard water. Even after standing for several days this solution shows only a very slight turbidity whereas, without the addition of the palmitate, the soap is precipitated almost completely. Thus, the addition of the palmitate allows of employing very hard water together with soap for washing or otherwise treating textiles without any of the disadvantages hitherto occurring with the employment of hard water. In the place of the aforesaid palmitate the mono-naphthenic ester of sorbitol penta-hydroxy-ethyl ether may be employed.

Example 11

Skeins or piece goods of viscose silk are treated at room temperature for about 10 minutes with a solution of 2 grams of the stearic mono-ester of sorbitol hexa-hydroxy-ethyl ether in 1 liter of water and the skeins are then centrifuged and dried at from 60° to 70° C. The silk acquires a very agreeable soft touch. A similar effect is obtained if the treatment be combined with dyeing, the stearic mono-ester being added to the dyebath.

Example 12

5 parts of the mono-ester from coconut fatty acids and the hexa-hydroxy-ethyl ether of sorbitol are mixed with 96 parts of olive oil and the mixture is slowly diluted with about 400 parts of water. A stable emulsion of the oil is obtained which can be usefully employed for softening textile materials, preferably after dilution with say, 100,000 parts of water. If olein be employed instead of castor oil the preparation may be employed for oiling textiles.

What we claim is:

1. Hydroxy-alkyl ethers of polyhydric alcohols which correspond to the general formula

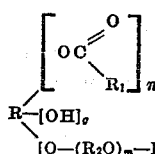
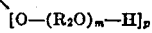

in which R denotes an aliphatic radicle which contains at least 3 carbon atoms, $R_1$ being an aliphatic radicle containing at least 5 carbon atoms, $R_2$ is an aliphatic radicle, $n$ is any integral number corresponding to the number of carbon atoms of R less at least 2, $p$ is at least 1 and at the most the number of carbon atoms of R less $(n+q)$ and $q$ is at the most the number of carbon atoms of R less $(n+p)$.

2. Hydroxy-alkyl ethers of polyhydric alcohols which correspond to the general formula:

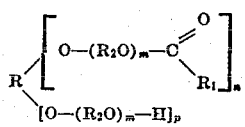

in which R denotes in aliphatic radicle containing at least 4 carbon atoms, $R_1$ an aliphatic radicle containing at least 5 carbon atoms, and $n$ is any integral number corresponding to the number of carbon atoms of R less at least 2, $R_2$ is an aliphatic radicle, $m$ is any integral number from 1 to 6 and $p$ is any integral number above 1 and at the most the number of carbon atoms of R less $n$.

3. Hydroxy-alkyl ethers of polyhydric alcohols which correspond to the general formula:

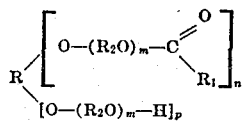

in which R denotes an aliphatic radicle containing at least 4 carbon atoms, $R_1$ an aliphatic radicle containing from 9 to 17 carbon atoms, and $n$ is any integral number corresponding to the number of carbon atoms of R less at least 2, $R_2$ is an aliphatic radicle, $m$ is any integral number from 1 to 6 and $p$ is any integral number above 1 and at the most the number of carbon atoms of R less $n$.

4. Hydroxy-alkyl ethers of polyhydric alcohols which correspond to the general formula:

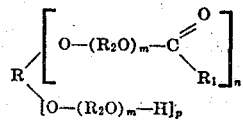

in which R denotes an aliphatic radicle containing from 4 to 6 carbon atoms, $R_1$ an aliphatic radicle containing at least 5 carbon atoms, and $n$ is any integral number corresponding to the number of carbon atoms of R less at least 2, $R_2$ is an aliphatic radicle, $m$ is any integral number from 1 to 6 and $p$ is any integral number above 1 and at the most the number of carbon atoms of R less $n$.

5. Hydroxy-alkyl ethers of polyhydric alcohols which correspond to the general formula:

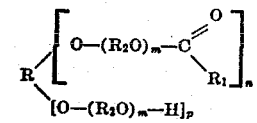

in which R denotes an aliphatic radicle containing from 4 to 6 carbon atoms, $R_1$ an aliphatic radicle containing from 9 to 17 carbon atoms, and $n$ is any integral number corresponding to the number of carbon atoms of R less at least 2, $R_2$ is an aliphatic radicle, $m$ is any integral number from 1 to 6 and $p$ is any integral number above 1 and at the most the number of carbon atoms of R less $n$.

6. Hydroxy-alkyl ethers of polyhydric alcohols which correspond to the general formula:

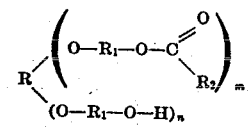

in which R denotes an aliphatic hydrocarbon radicle containing 6 carbon atoms, $R_1$ is an alkylene radicle containing at least 2 carbon atoms, $R_2$ is an aliphatic radicle containing at least 5 carbon atoms, $m$ is any integral number from 1 to 4 and $n$ is 6 less $m$.

7. Hydroxy-alkyl ethers of polyhydric alcohols which correspond to the general formula:

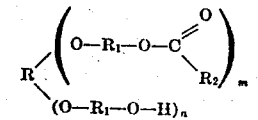

in which R denotes an aliphatic hydrocarbon radicle containing 6 carbon atoms, $R_1$ is an alkylene radicle containing at least 2 carbon atoms, $R_2$ is an aliphatic radicle containing from 9 to 17 carbon atoms, $m$ is any integral number from 1 to 4 and $n$ is 6 less $m$.

8. Carboxylates containing at least two free hydroxyl groups, of hydroxyl-alkyl ethers of sorbitol, in which carboxylates the carboxylic acid radicles contain from 10 to 18 carbon atoms.

9. Esters containing at least two free hydroxyl groups, of hydroxyl-alkyl ethers of sorbitol with vegetable fatty acids.

10. Hydroxy-alkyl ethers of glycerol in which one hydroxyl group is replaced by

R defining an aliphatic radicle with at least 5 carbon atoms.

11. Mono-esters of glycerol tri-hydroxy-ethyl ether with fatty acids containing from 9 to 17 carbon atoms.

OTTO SCHMIDT.
EGON MEYER.